United States Patent [19]

Kier, Jr.

[11] Patent Number: 5,533,260
[45] Date of Patent: Jul. 9, 1996

[54] METHOD OF MANUFACTURING A VEHICLE WHEEL

[75] Inventor: Charles E. Kier, Jr., Lansing, Mich.

[73] Assignee: Motor Wheel Corporation

[21] Appl. No.: 324,335

[22] Filed: Oct. 17, 1994

Related U.S. Application Data

[62] Division of Ser. No. 31,272, Mar. 15, 1993, Pat. No. 5,380,071.

[51] Int. Cl.⁶ .................................................. B23P 19/00
[52] U.S. Cl. ................................................. 29/894.322
[58] Field of Search ........................................ 29/894.322

[56] References Cited

U.S. PATENT DOCUMENTS

| | | |
|---|---|---|
| 1,765,848 | 6/1930 | Prescott . |
| 1,819,622 | 8/1931 | Roberts . |
| 2,083,066 | 6/1937 | Hunt . |
| 2,209,030 | 7/1940 | MacDonald . |
| 2,237,481 | 4/1941 | Ferro . |
| 2,251,539 | 8/1941 | Ash . |
| 2,363,182 | 11/1944 | Hunt et al. . |
| 3,143,377 | 8/1964 | Bulgrin et al. . |
| 3,391,439 | 7/1968 | Bulgrin et al. . |
| 3,586,381 | 6/1971 | Siegel . |
| 3,611,535 | 10/1971 | Nobach . |
| 3,951,563 | 4/1976 | Ravenhall . |
| 4,279,287 | 7/1981 | Daudi et al. . |
| 4,354,407 | 10/1982 | Daudi et al. . |
| 4,466,670 | 8/1984 | Kaji . |
| 4,610,482 | 9/1986 | Overbeck et al. . |
| 4,646,434 | 3/1987 | Daudi . |
| 4,733,448 | 3/1988 | Daudi . |
| 4,770,220 | 9/1988 | Mori . |
| 4,815,186 | 3/1989 | Daudi . |
| 4,841,622 | 6/1989 | Murano et al. . |
| 4,953,275 | 9/1990 | Mori . |
| 5,138,757 | 8/1992 | Ball et al. . |
| 5,235,886 | 8/1993 | Jurus . |
| 5,257,569 | 11/1993 | Santarossa . |
| 5,345,672 | 9/1994 | Ball et al. . |

FOREIGN PATENT DOCUMENTS

| | | |
|---|---|---|
| 837649 | 4/1952 | Germany . |
| 4128343 | 3/1993 | Germany . |

*Primary Examiner*—P. W. Echols
*Attorney, Agent, or Firm*—Barnes, Kisselle, Raisch, Choate, Whittemore & Hulbert

[57] ABSTRACT

A multi-piece, non-take-apart vehicle wheel disc and rim assembly and method of making the same. The wheel rim has a disc mounting flange extending radially inwardly of the rim which radially overlaps the disc. The disc and rim are each finish formed prior to assembly and each have a set of assembly-mounting holes extending parallel to the wheel axis which are generally registered in initial assembly. One assembly hole set is preformed slightly larger in diameter than the other. The rim is fixtured on an assembly apparatus to orient the average axis of the rim bead seats on a predetermined first axis of the apparatus. Then the disc is placed loosely on the rim with the sets of disc and rim assembly holes generally registered. Then the disc is precision located relative to the rim by a locating means to align the axes of the disc bolt holes and/or center pilot opening on a predetermined second axis of the apparatus by lateral bodily shifting of the disc radially relative to the rim to accomplish such alignment as necessary. Assembly fasteners are inserted in the registering assembly holes, and then, while so fixtured and located, the disc and rim are permanently fixed together by permanently fixing the fasteners in a non-take-apart mode.

13 Claims, 3 Drawing Sheets

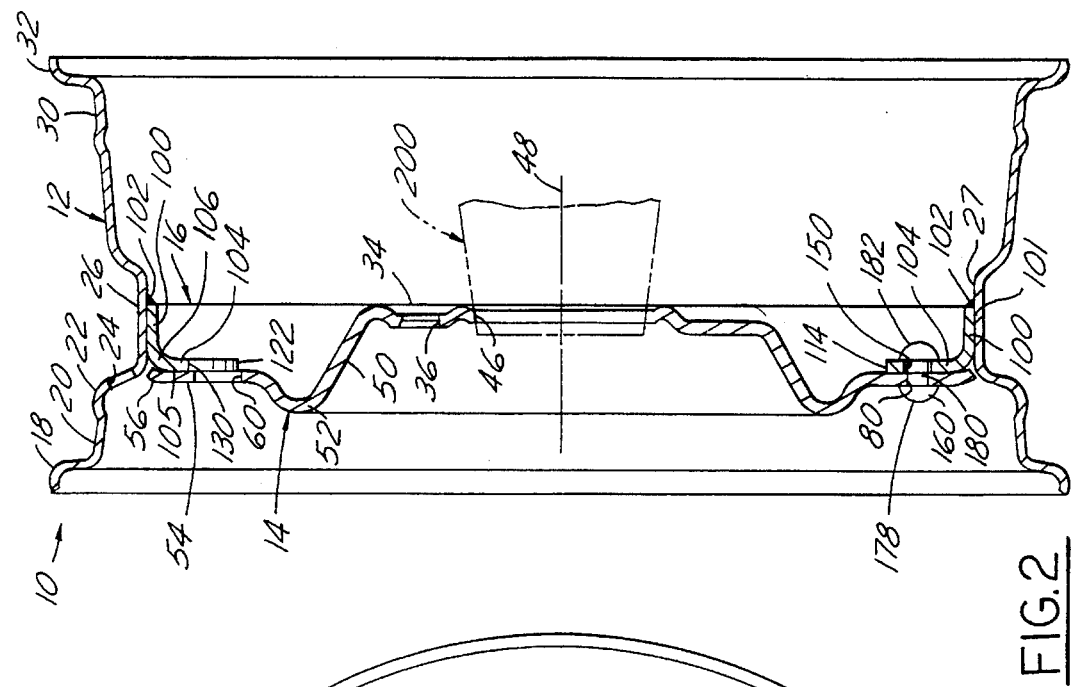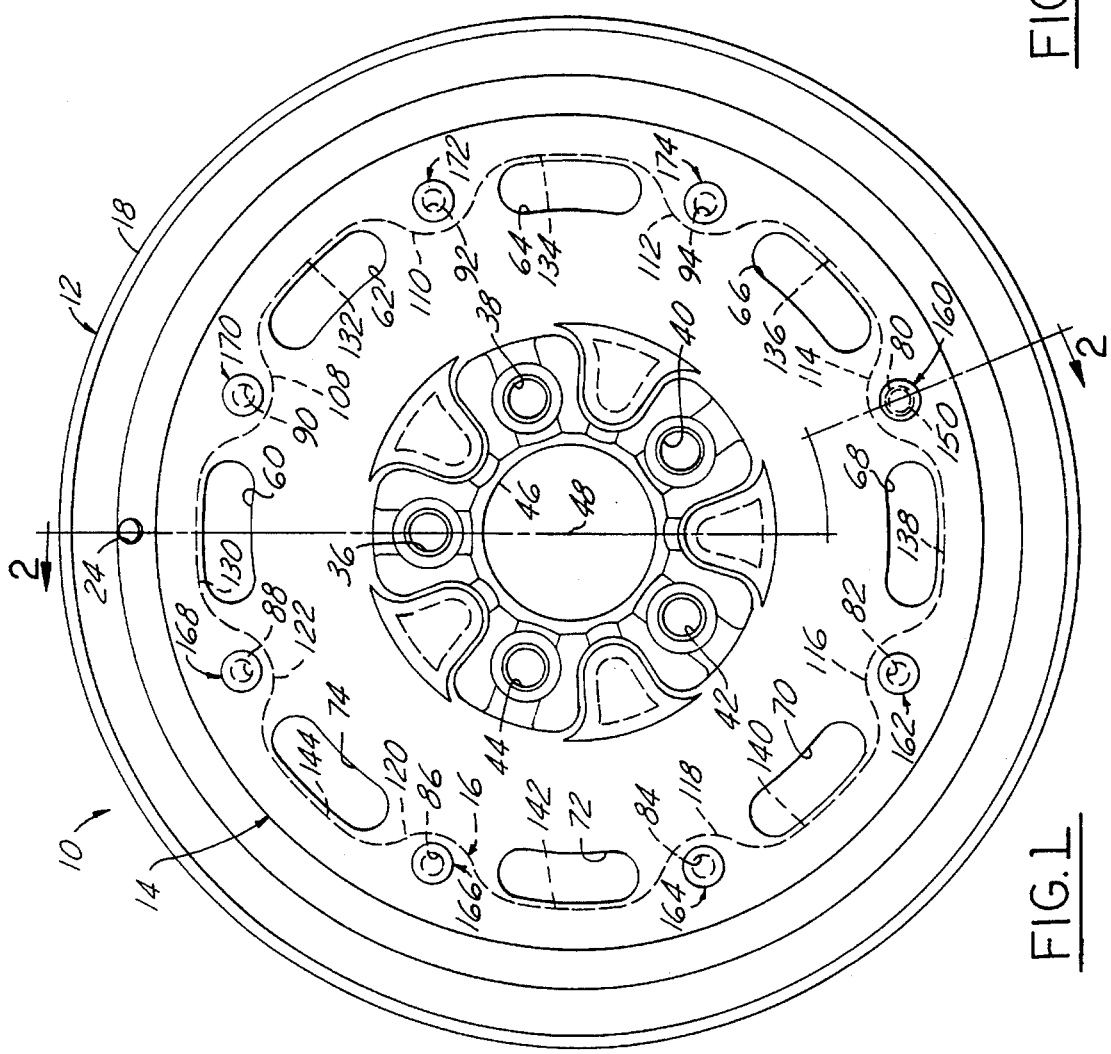

METHOD OF MANUFACTURING A VEHICLE WHEEL

This application is a division of application Ser. No. 08/031,272, filed Mar. 15, 1993, now U.S. Pat. No. 5,380,071, issued Jan. 10, 1995.

FIELD OF INVENTION

The present invention relates to the art of vehicle wheel manufacture and more particularly to wheels for automotive vehicles utilizing a non-take-apart rim adapted for mounting of a tubeless tire thereon.

BACKGROUND OF INVENTION

In the present day manufacture of wheels for automotive vehicles, such as passenger cars and light trucks operable at relatively high speeds on modern highways, much concern and development has been directed to the manufacture of such wheels to precise tolerances, and in particular to the relationship of the mounting openings in the disc of such wheels relative to the average axis of the bead seats of the rims of such wheels in order to reduce both radial run-out on the rim bead seats relative to the axis of rotation of the wheel when mounted to a vehicle, as well as the lateral run-out characteristics of such wheels. In addition, as set forth in U.S. Pat. Nos. 4,279,287 and 4,354,407 (assigned to the assignee of record herein), certain O.E.M. wheel customers have required precise controlled eccentricity of such disc mounting holes relative to the rim bead seats to provide wheels having a predetermined off-center relationship of the disc wheel mounting openings relative to the rim bead seats for tire-to-wheel "match-mounting" purposes. This has been achieved hitherto by permanently assembling a disc to a rim, either by welding of a preformed disc to a preformed rim, or by casting or forging of an aluminum or magnesium wheel as a one-piece wheel with the disc integrally joined to the rim by this process. Then, the final mounting openings are formed in the disc after such assembly so as to provide accurate referencing of the location and axis of such mounting holes relative to the rim bead seats. Such after-assembly wheel mounting hole formation procedures require special additional forming and after-operation equipment and welding procedures. The constructional characteristics of such prior wheels often limit or prevent the combination in the wheel of parts formed of dissimilar metals and by dissimilar processes, which would otherwise be desired to optimize strength-to-weight ratio characteristics in the wheel. Such prior wheel characteristics also limit or prevent part standardization between various wheel designs which otherwise would reduce production costs.

OBJECTS OF THE INVENTION

An object of the present invention is to provide an improved wheel construction and method of making the same which will overcome the aforementioned problems inherent in wheel mounting opening after-forming operations, and which enables the wheel assembly to be constructed having precise on-center or off-center characteristics, as desired, in a simple, reliable and economical manner.

Another object of the present invention is to provide an improved wheel construction and method of foregoing character which enables the improved wheel construction to be made on conventional wheel making equipment similar to that utilized in the formation of the historic "plain Jane" or "base" wheels, but with greatly improved radial and lateral run-out tolerances thereover, as well as enabling accurate and economical manufacture of controlled eccentricity wheels of this type.

A further object is to provide an improved wheel construction and method of the foregoing character which provides the flexibility of a multi-piece wheel construction from the design standpoint, but which insures permanent retention of wheel tolerances and part relationships throughout the life of the wheel in service.

BRIEF DESCRIPTION OF THE DRAWINGS

Presently preferred embodiments of the invention, together with additional objects, features and advantages thereof, are set forth in the following detailed description, the appended claims and illustrated in the accompanying drawings (which are scaled from engineering drawings unless otherwise indicated) in which:

FIG. 1 is an elevational view of the outboard side of a first embodiment of a wheel construction in accordance with the present invention;

FIG. 2 is a sectional view taken on the line 2—2 of FIG. 1;

DETAILED DESCRIPTION OF THE PREFERRED EMBODIMENTS

First Embodiment

Figure 4:
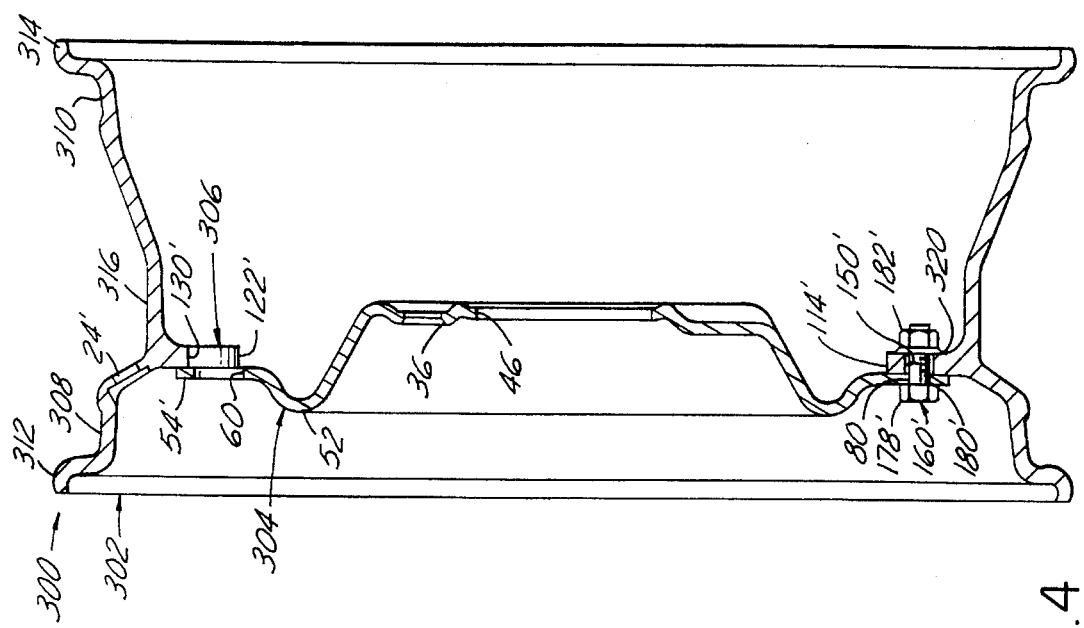
FIG. 4 is a sectional view taken on the line 4—4 of FIG. 3.

Referring to FIGS. 1 and 2, a first embodiment of a vehicle wheel 10 constructed in accordance with the method, apparatus and constructional features of the present invention provides a permanent assembly of three major components, namely a one-piece, drop-center type wheel rim 12, a wheel mounting disc 14 (also variously termed in the art a "spider", "wheel body", "wheel center" or "web"), and a mounting ring or hoop 16 (FIG. 2) interconnecting rim 12 with disc 14 via permanently set fastener means as described in more detail hereinafter.

Wheel rim 12 is preferably made on conventional rim forming equipment by coiling flat strip stock into a hoop, butt welding the ends of the same together, and then die and roll forming the hoop to the final configuration shown in FIGS. 1 and 2. Rim 12 is thus final formed with an outboard tire bead retaining flange 18, outboard tire bead seat 20, safety humps 22, a valve stem hole 24, a drop-center well 26, an inboard safety hump 28, an inboard tire bead seat 30 and an inboard tire bead retaining flange 32.

Disc 14 likewise may be formed in conventional transfer press progressive die forming operations so as to have a conventional wheel mounting bolt circle area providing an interrupted wheel mounting face 34 on its inboard side, a circular row (i.e., circle) of chamfered wheel mounting bolt holes 36, 38, 40, 42, 44 (FIG. 1) and a center pilot opening 46 having its axis coincident with the axis of the bolt hole circle and coincident with the average axis of rotation 48 of bead seats 20 and 30 (on-center relationship). Alternatively, the axes of pilot opening 46 and the circle of bolt holes may be eccentrically displaced a predetermined amount and in a predetermined direction from the average axis 48 of bead seats 20 and 30 at a selected location circumferentially of wheel 10, e.g., in the direction of valve hole 24. In the latter event, wheel 10 may be made broadly in accordance with the method of U.S. Pat. Nos. 4,279,287 and 4,354,407 (assigned to the assignee of record herein) for tire-to-tire "match-mounting" purposes, as modified herein.

Disc 14 also has a conventional "hat section" 50 with a crown portion 52 which extends radially outwardly into an annular mounting portion 54 extending substantially radially of the wheel axis 48 and terminating in a slightly inboard-bent circumferential edge portion 56. Disc 14 is also provided with suitable air vent or "window" openings 60, 62, 64, 66, 68, 70, 72 and 74 (FIG. 1) disposed at equally angularly spaced increments in a circumferentially extending row (i.e., circle) encircling the crown portion 52 of the disc. Disc 14 also has a circumferentially spaced annular row (i.e., circle) of assembly fastener openings 80, 82, 84, 86, 88, 90, 92 individually positioned midway between adjacent disc windows 60–74 and disposed with their centers slightly radially outwardly of the centers of the window openings (FIG. 1).

Connector hoop 16 is a die formed annulus generally L-shaped in radial cross-section having an axially extending flange portion 100 of generally cylindrical form. Preferably, flange 100 has a slightly divergent taper inboard of wheel 10 in the order of 2 to 3 degrees, and is sized at its outer periphery 101 to have a press-in telescopic fit with the radially inwardly facing surface 27 of drop-center well 26 of rim 12. In the embodiment shown in FIGS. 1 and 2, hoop flange 100 is circumferentially continuous and thus has a 360° contact with surface 27 of well 26. Alternatively, flange 100 may be circumferentially discontinuous if a "spoke" and "chain-slot" type of disc 14 is utilized in wheel 10. Hoop 16 is permanently secured to rim 12 by a circumferentially extending weld 102 which may be an interrupted or a continuous weld in accordance with the load and service requirements imposed on wheel 10.

Hoop 16 also has a radially inwardly extending flange portion 104 integrally joined to flange 100 by a right angle bend 106. The radially inward edge of flange 104 has a scalloped contour in side elevation (FIG. 1) defined by circumferentially spaced radially inwardly extending semi-circular convex surfaces 108, 110, 112, 114, 116, 118, 120, and 122 (FIG. 1) individually disposed between an adjacent pair of windows 60–74, and alternating with circumferentially extending edge portions 130, 132, 134, 136, 138, 140, 142 and 144 (FIG. 1) located slightly outwardly radially (of wheel 10) of the radially outermost edge of windows 60–74. The inwardly protruding edge portions 108–122 of hoop flange 104 thus form scallops or ears with which the disc fastener openings 80–94 are individually registered in angular alignment.

Each of the scallops or ears 108–122 of hoop flange 104 is also provided with an assembly through-opening, such as assembly opening 150 seen in FIG. 2 in scallop ear 114, nominally coaxial with the associated registered opening, such as opening 80 in the associated scallop ear 114. However, the diameter of each scallop opening 150 of ears 108–122 is made slightly larger than the diameter of the associated disc openings 80–92 by a predetermined amount, preferably on the order of 0.060 inches diametrically (0.030" on each side, i.e., "radial").

Disc 14 is permanently joined to connector hoop 16, and hence to rim 12, by six fasteners 160, 162, 164, 166, 168, 170, 172 and 174 (FIGS. 1 and 2). In this first embodiment wheel 10, each of the fasteners 160–174 consists of a rivet having an outboard head 178, a shank 180 preferably inserted with a tight-fit or slight press fit through associated disc hole 80 so as to protrude inboard through the associated hoop hole 150 with a clearance fit in initial assembly. As explained in more detail hereinafter, the inboard end of rivet 160 terminates in an inboard rivet head 182 formed by upset cold heading in a manner to tightly clamp disc flange 54 against hoop flange 104 while simultaneously enlarging shank 180 in the portion thereof registered with hole 150 in flange 104 so as to take up the shank-to-hole clearance and thereby enlarge this portion of the rivet shank securely against the margin of hole 150.

Further in accordance with the method of the invention, wheel 10 is constructed and assembled in predetermined stages in the following manner. Each of the three main parts consisting of rim 12, disc 14 and connector hoop 16 is separately formed and finished to its final design dimensions, including the formation, location and sizing of the disc mounting openings 36–46 and disc fastener holes 80–94, as well as the hoop fastener holes 150 provided one in each of the scallops 108–122. The disc and hoop assembly fastener holes are precision formed to close tolerances in the separate formation of the disc 14 and connector hoop 16. Likewise the disc center pilot opening 46 and the disc bolt holes 36–44 are precision formed with the axis of the bolt hole circle concentric with the axis of center opening 46. Such assembly fastener hole and bolt hole forming, as well as center opening forming operations, may be performed by punching or by machining (drilling, reaming, boring, etc.) as desired in accordance with equipment availability.

In the next stage, connector hoop 16 is subassembled by press fit into rim 12 so as to locate the same to provide the desired wheel offset dimension relative to rim 12, and to provide the disc mounting plane 34 oriented perpendicular to the nominal axis of rim 48 after assembly of disc 14 to hoop 16. This operation may be performed by conventional disc to rim assembly machinery, such as disclosed in U.S. Pat. Nos. 1,819,622; 3,143,377; 3,391,439; and 4,841,622, or, preferably, by the improved disc to rim assembly method and apparatus as disclosed and claimed in U.S. Pat. Nos. 4,646,434; 4,733,448 and 4,815,186 assigned to Motor Wheel Corporation, the assignee of record herein, and which are incorporated by reference herein, the same being suitably modified to accommodate connector hoop 16 structure instead of a full disc with associated mounting flange, to thereby insure better control of the lateral run-out characteristics of wheel 10.

With connector hoop 16 thus being temporarily affixed by its press fit in the drop center well 26 of rim 12, hoop 16 is permanently secured in position by forming the circumferential connecting weld 102, which may be accomplished utilizing conventional rim to disc welding and fixturing equipment.

In the next operation, the subassembly of rim 12 and connector hoop 16 is placed, with its outboard side up and its axis 48 vertical, on a suitable fixturing table provided with fixturing jaws which grip one or both of the rim bead seats 20 and 30 at circumferentially spaced locations around the rim to thereby precisely locate the axis of the rim, or more particularly, the average axis of the bead seats 20 and 30, on a predetermined axis of the fixturing equipment. This can be accomplished by suitably adjusting the conventional fixturing jaws of a disc to rim assembly machine, as will be understood by those skilled in the art. Alternatively, and preferably, the rim fixturing apparatus disclosed and claimed in co-pending U.S. patent applications Ser. No. 07/890,799, filed Jun. 1, 1992 in the name of Walter A. Santarossa (now U.S. Pat. No. 5,257,569), or Ser. No. 07/863,021, filed Apr. 3, 1992 in the name of Kevin D. Jurus (now U.S. Pat. No. 5,235,886), both assigned to the assignee of record herein and incorporated by reference herein, can be utilized for this purpose.

With the subassembly of disc and hoop connector 16 thus fixtured and precisely located, the next step is to place disc 14 loosely on the upwardly facing, outboard surface 105 of hood flange 104 with the disc assembly holes 80–94 individually generally registered with the associated hoop assembly holes 150 in scallops 108–122. Disc 14 also may be angularly oriented so as to align a given bolt hole 36 with the valve hole 24 in rim 12.

Then, by means of a conventional conical centering mandrel 200, indicated schematically and fragmentarily in FIG. 2, disc 14 is bodily shifted laterally (radially of wheel 10) by insertion of mandrel 200 into center pilot opening 46. Mandrel 200 may be axially movable as part of a mechanism of the final assembly machine as conventionally employed in certain wheel manufacturing operations, as will be well understood by those skilled in the art. For example, mandrel 200 may be mounted on a commercially available automatic CNC 3-axis work fixturing mechanism for this purpose.

Since mandrel 200 is precision formed, as is center pilot opening 46, the axis of disc 14 may be located by the mandrel in a predetermined location as desired, either coincident (on-center) with the average axis 48 of bead seats 20, 30, or shifted therefrom radially of the wheel by a predetermined amount and in a predetermined direction, such as toward valve hole 24, in accordance with the aforementioned U.S. Pat. No. 4,279,287 and 4,354,407, to provide a controlled eccentricity of the wheel pilot 46 and bolt holes 36–44 relative to the average axis of bead seats 20 and 30 for tire-to-wheel match-mounting purposes. In accordance with one principle feature of the present invention, the range of possible misalignment of the respective disc and hoop assembly holes permitted by the predetermined fastener-to-assembly hole clearance enables such limited bodily shifting of the disc relative to the rim.

The next step in the assembly operation is to insert rivets 160–174 individually into the associated fastener holes 80–94 of disc 14, preferably with a press fit of the rivet shank 180 in the associated disc holes. Alternatively, rivets 160–174 may be so preassembled to disc 14 prior to placing disc 14 onto connector hoop 16. Due to the predetermined clearance between the shanks 180 of rivets 160–174 in the associated hoop holes 150 of hoop ears 108–122, the rivets have a loose fit in the hoop holes 150 as they protrude therethrough. If desired, rivet shanks 180 may have a slight taper (convergent toward their free ends) to further facilitate entry of the shanks into hoop holes 150, particularly when the rivets are preassembled in disc 14. These predetermined rivet shank-hoop hole clearances thus enable disc 14 to be shifted by mandrel 200 radially of hoop 16 within the limits of these clearances. Typically, for match mounting purposes, the controlled radial eccentricity imparted to disc 14 may be on the order of 0.003 to 0.005 inches (0.006 to 0.010 inches diametrical) depending upon the eccentricity specification desired by the OEM automobile manufacturer for match mounting of tires to the wheel. For on-center wheels the nominal shift imparted by mandrel 200 will be substantially less, i.e., only that required to bring the axis of the disc center opening 46 (along with the axis of the circle of bolt hole openings 36–44 as previously coaxially set in relation to the axis of opening 46 in the disc-making operation) coincident with the average axis of the rim bead seats 20, 30.

With the rivets 160–174 so inserted through the associated openings 150 of the connector hoop ears 108–122 and with the rivet shanks protruding inboard therefrom, a suitable riveting fixture is engaged with each rivet and surrounding material of disc flange 54 and hoop flange 104 to thereby cold form inboard rivet heads 182 while upsetting the portion of rivet shank 180 disposed within the hoop holes 150. The riveting operation thus firmly fixes disc 14 permanently to hoop 16 in the desired fixed location of the disc relative to the rim bead seats 20 and 30. Most if not all of the initial clearance between the rivet shank 180 and hoop holes 150 is taken up by the deformation and outward bulging of the rivet shank into and against the inner margin of hoop holes 150. Hence the initial loose clearance fit is converted to a tight fit. In addition, disc flange 54 is tightly clamped against the hoop flange 104 with sufficient force to maintain the assembled relationship of the disc and rim despite normal automotive service loading and use.

The riveting operation may be performed by conventional riveting equipment as a gang riveting operation to simultaneously form all of the rivets 160–174, or may be formed by a single head riveter appropriately sequenced to form the six rivets 160–174 seriatim.

At the completion of the riveting operation, mandrel 200 is withdrawn, and the riveting equipment and fixture for the rim 12 are retracted, wheel 10 now being permanently assembled with an accurate relationship of its mounting holes or openings to the rim bead seats.

Wheel 10 may then be processed through further finishing operations, such as painting and plating. However, in accordance with another feature of the present invention, since each of the main components consisting of disc 12, connector hoop 16 and disc 14 may be completely finished prior to final assembly together, it is also possible to give each of these parts its final desired finish as by, for example, prepainting of the subassembly rim 12 and hoop 16, and preplating of disc 14 or vice-versa. Hence, the assembled wheel 10 may have a composite finish not readily obtainable in a conventional plain Jane wheel wherein the disc and its mounting flange are integrally formed as one piece and must be welded to rim 12 prior to painting or plating finishing operations.

Alternatively, wheel 10 can be constructed with the disc holes 80–94 precision formed to a larger diametrical dimension than the associated hoop holes 150, and the fastening rivets 160 reversed and inserted from the inboard side so that rivet heads are formed outboard in the rivet setting operation. However, for appearance purposes, the preformed rivet head 170 is preferably located on the outboard side of the wheel as described previously.

As another modification of the foregoing method connector hoop 16 may be initially formed without the mounting holes 150, and then permanently subassembled in this condition to rim 12 pursuant to the foregoing procedure. Mounting holes 150 then may be formed in the scallop ears 108–122 of hoop flange 104 by piercing or machining operations such as drilling and boring while the subassembly of the rim 12 and hoop 16 is held suitably fixtured, i.e., a so-called "pierce-after" or "machine-after" type operation. However the previously described procedure of completely finishing each of the three parts prior to forming the subassembly of rim 12 and hoop 16, and the final assembly of disc 14 with the subassembly, is preferred for economy in production inasmuch as conventional wheel making equipment may be readily converted to manufacture each of these parts as well as to assemble, weld and rivet the same.

An added advantage is the styling imparted to the outboard side of wheel 10 by the rivet heads 178 of rivets 160–174, which impart a rugged appearance presently accomplished in some styled one-piece aluminum wheels by the expensive addition of false rivets having no fastening function. If desired, the outboard heads 178 of rivets 160–174 may be chromed plated for this purpose prior to installation in the final assembly procedure.

Second Embodiment

Figure 3:
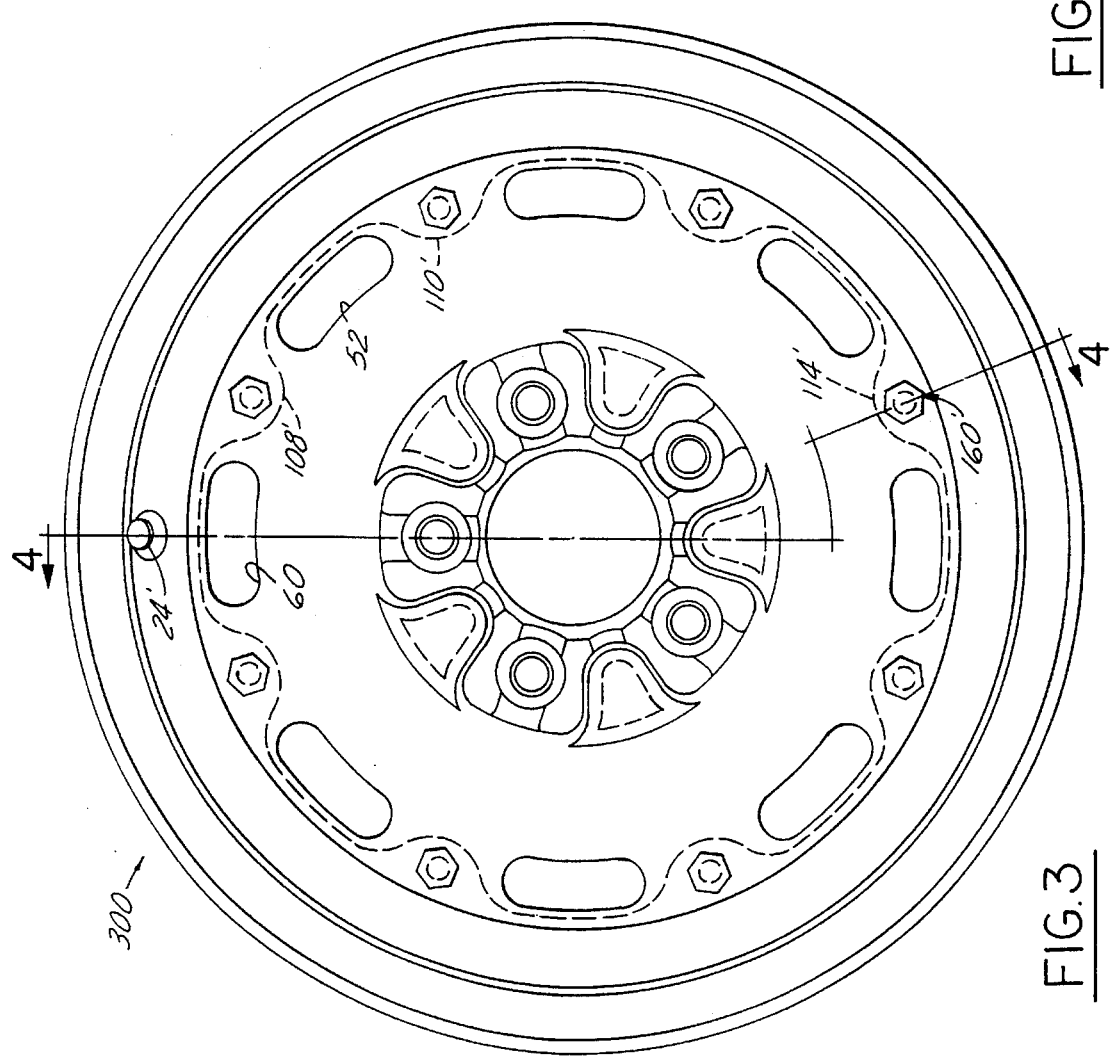
FIG. 3 is an elevational view of the outboard side of a second embodiment of a wheel construction of the invention.

Referring to FIGS. 3 and 4, a second embodiment wheel 300 is illustrated having a modified construction and made by a modified method, also in accordance with the present invention. Wheel 300 has only two basic parts, namely a wheel rim 302 and a wheel disc 304, rim 302 having an integral mounting ring 306 corresponding in function to connector hoop 16 of wheel 10. Disc 304 may be identical to disc 14, and hence like structural elements are given identical reference numerals. Likewise, those elements of mounting ring 306 corresponding in function to that of connector hoop 16 are given the same reference numerals raised by a prime suffix.

Rim 302 may be made of light metal, such as a suitable aluminum alloy or magnesium alloy, as a one-piece casting or forging and suitably machined to final dimension to provide a drop center well, one-piece rim suitable for use with tubeless pneumatic tires for automotive passenger vehicles such as passenger cars and light trucks. Hence rim 302 has finished dual bead seats 308 and 310 respectively adjacent the outboard and inboard tire bead retaining flanges 312 and 314. A suitable flange is integrally cast with the rim so as to protrude radially inwardly from the outboard edge of the drop center well portion 316 of rim 30 to thereby form the integral mounting ring 306. Mounting ring 306 may have the same scalloped configuration as hood connector 16 so as to have the corresponding scallop ears 108', 110', etc., circumferentially interposed between the window 60, 62, etc. of disc 304.

Disc 304 differs slightly from disc 14 in having a slightly shorter outer marginal radial flange 54', and the radially in-turned edge 56 of disc 14 is omitted.

Because mounting ring 306 is formed integrally with rim 302, the steps of preassembling and welding hoop 16 to rim 12 are eliminated in formation of wheel 300. However, the steps of assembling disc 304 to rim 302 are essentially the same as that described in conjunction with assembling disc 14 to subassembly 12–16 described previously.

FIGS. 3 and 4 also illustrate a modified fastening system which may be employed with either wheel 10 or wheel 300, i.e., utilizing threaded fasteners 160' each consisting of a mounting stud having a polygonal outboard head 178' and a threaded shank 180' which protrudes inboard beyond the inboard surface of mounting ring 306. Fastener 160' also utilizes a nut 182' and associated lock washer 320 (FIG. 4) to thereby provide a threaded nut and bolt fastening system instead of the riveting system of the first embodiment. However, as in the first embodiment, studs 160' may be preassembled to disc 304 if desired and have a press fit through the associated disc mounting holes. Again, the mounting ring holes 150' associated with each disc hole are each provided with a predetermined diametrical dimension insuring a given clearance with the threads of the stud shank 180'. This enables a predetermined amount of lateral bodily shifting of disc 304 relative to rim 302 by the assembly cone mandrel 200 in the manner previously described. Once disc 304 is properly oriented relative to rim 300 as in the previously described final assembly procedure, the individually associated washer 320 and inboard nuts 182' are installed on the inboard ends of stud shanks 180' and tightened down simultaneously or in any desired tightening sequence in seriatim. In order to insure permanent assembly of disc 304 to rim 302, nuts 182' may be suitably fixed to shanks 180' by swedging or tack welding as a final operation, or by use of commercially available permanent lock nuts. Wheel 300, like wheel 10, thus has the desired precise on-center characteristics of wheel 10, or can be made to have a precisely controlled eccentricity characteristic for match mounting.

Additionally, the second embodiment wheel 300 illustrates further advantages of the present invention in that it illustrates how the wheel having the aforementioned desirable characteristics may be made with dissimilar components. Disc 304 may be made by a conventional steel stamping in conventional transfer press successive die stamping piercing, etc. operations, and may be fabricated from sheet metal such as mild carbon steel or HSLA steel employed in conventional steel wheel manufacture, or may be made from stainless steel or aluminum sheet material. By contrast, rim 302 may be cast or forged from a dissimilar metal, such as suitable aluminum alloy or magnesium, to thereby reduce the weight of the overall wheel. Since the maximum stress areas in the wheel assembly with respect to fatigue life in service generally are located in the disc 304, the strength-to-weight and stress flexure advantages of a stamped steel part utilized as disc 304 can eliminate the heavy cast sections normally required to withstand such service loading in conventional one-piece aluminum or magnesium wheels. Hence the overall strength to weight ratio of the wheel may be optimized utilizing the composite construction principles of wheels 10 and 300 of the present invention. The non-take-apart multi-piece construction of wheels 10 and 300 also optimizes utilization of existing wheel manufacturing equipment, providing economy of wheel manufacture and construction. Again, greater flexibility is provided in terms of variations in painting and chrome plating of the separate components prior to final assembly to enhance styling possibilities at reduced costs. In addition, different configurations of disc 14 and/or 304 may be utilized in order to vary the desired offset dimension of the finished wheels 10 and 300, without thereby requiring a variation in the rim and disc subassembly 12–14 of the first embodiment or the rim 302 of the second embodiment. Alternatively, in wheel 10, the connector hoop 16 may be varied in configuration in order to provide varying wheel offsets without altering the standardized rim 12 and standardized wheel disc 14.

Third Embodiment

Figure 5:
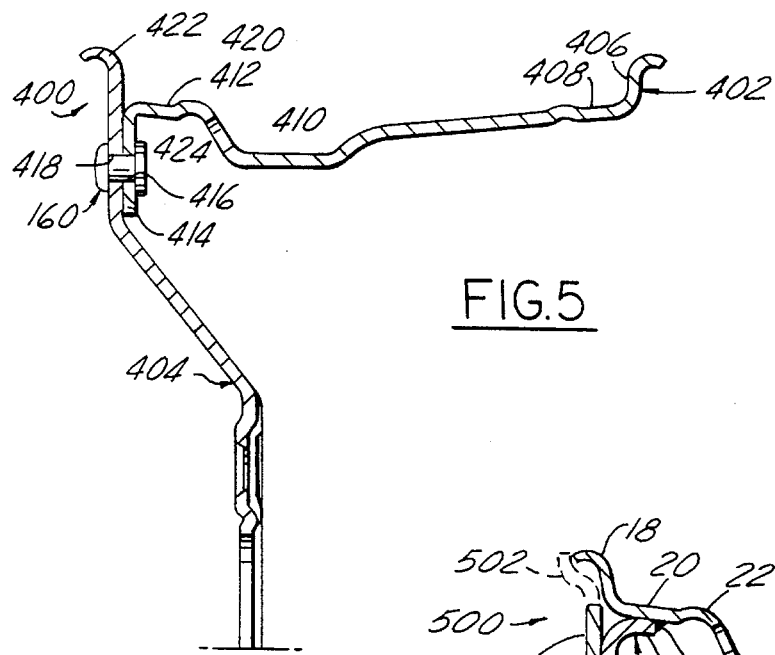
FIG. 5 is a fragmentary radial cross-sectional view of a third embodiment of a wheel construction provided in accordance with the present invention.

FIG. 5 illustrates a third embodiment wheel of the present invention employing the assembly method and constructional features of wheels 10 and 300 as described previously, but applied to a so-called "fullface" type wheel (such as that disclosed in United States Overbeck et al U.S. Pat. No. 4,610,482, also assigned to the assignee of record herein). Wheel 400 of FIG. 5 consists essentially of two parts, a rolled drop-center rim 402 and a stamped full face disc 404. Rim 402, like rim 12 of the aforementioned 4,610,482 patent, may be roll formed similar to rim 12 of wheel 10 of FIGS. 1 and 2 herein so as to have an inboard tire bead retaining flange 406, an inboard tire bead seat 408, a drop-center well 410, and an outboard tire bead seat 412. However, instead of having an outboard bead retaining flange similar to flange 18 of rim 12 of FIG. 2 herein, rim 402 has a radially in-turned flange 414 either die formed, or preferably rolled formed as a final operation in the formation of rim 402. Flange 414 is made so as to extend radially inwardly of the wheel for a greater distance than flange 30 of the aforementioned Overbeck U.S. Pat. No. 4,610,482 so as to serve the additional function of the connector hoop 16 of wheel 10 (FIGS. 1 and 2) or connector flange 306 of wheel 300 (FIGS. 3 and 4).

As in wheels 10 and 300, connector flange 414 is provided with precision oversize holes 416 in a circumferentially spaced circular row array in flange 414.

Disc 404 may be configured similar to disc 14 of the aforementioned Overbeck et al U.S. Pat. No. 4,610,482, but in accordance with the present invention it is made as a finished part with the wheel mounting bolt holes and center pilot opening preformed to final dimensions in disc 404 prior to assembly to rim 402. Hence disc 404 will have the circular row of fastener openings 418 formed therein to receive the shank 180 of fasteners 160, either in preassembly or final assembly, as described previously in conjunction with wheel 10.

Wheel 400 is assembled in a manner similar to the procedures described in conjunction with wheels 10 and 300, i.e., rim 402 is suitably clamped into a rim fixture with its axis vertical and the full face disc 404 placed loosely on the outboard surface of flange 414. Then the desired predetermined relationship of the axis of the bolt circle holes and the center pilot opening relative to bead seats 408 and 412 of rim 402 is established by the mandrel 200 and these parts held in this relationship as the fasteners 160 are cold headed to thereby rivet rim 402 to disc 404.

Air tightness of the rim to disc assembly of wheel 400 may be obtained by utilizing an 0-ring seal 420 installed between the outboard surface of flange 414 and the inboard face of the outboard tire bead retaining flange 422 of disc 404. For this purpose a suitable groove 424 may be stamped into the inboard surface of disc flange 422 to facilitate preassembly of O-ring 420 onto disc 404 prior to placement of disc 404 on rim 402. The final riveting procedure, in drawing disc 404 tightly against rim flange 414, serves to compress seal 420 to insure the air tightness of assembly for use with tubeless pneumatic tires.

Alternatively, air tightness may be obtained at the joint between the rim and disc by applying a coating of a suitable permanently resilient adhesive sealant to the outboard face of flange 414 prior to placement of disc 404 thereon in the assembly procedure.

It will thus be seen that the full face wheel embodiment 400 of the present invention provides the previously stated advantages of wheels 10 and 300 while also eliminating the weld 16 and welding operation involved in formation of the flare bevel weld joint 16 of the aforementioned Overbeck et al U.S. Pat. No. 4,610,482. It is also to be understood that threaded fasteners, such as fasteners 160' of wheel 300, may be substituted for the rivet fasteners 160 illustrated in FIG. 5. The full face construction of wheel 400 also eliminates the need for a pierce-after or machine-after mounting hole forming operation employed in the aforementioned Overbeck et al U.S. Pat. No. 4,610,482 while obtaining the precision, fixed location of the disc mounting openings relative to the average axis of the rim bead seats 408 and 412, whether it be on-center or having a controlled eccentricity relative thereto. Again, the full face disc 404 may be prefinished prior to assembly, as by plating or painting without concern for the deleterious after-effects of a final weld joint connection relative to such a prefinish. Although the outboard appearance of full face 404 will necessarily be altered by the presence and appearance of the heads of the fasteners 160 or 160' employed in the system, in certain stylizations of disc 404 the presence of such fastener heads may be deemed a styling advantage, as indicated previously. Alternatively, wheel 400 may be suitably designed to serve as a "backbone" for use in making composite metal and plastic styled wheels such as those sold commercially under the trademark "POLYCAST" of the assignee of record herein. In such applications, the decorative urethane body molded against the outboard face of disc 404 can be used to cover the heads of fasteners 160 or 160'.

Fourth Embodiment

Figure 6:
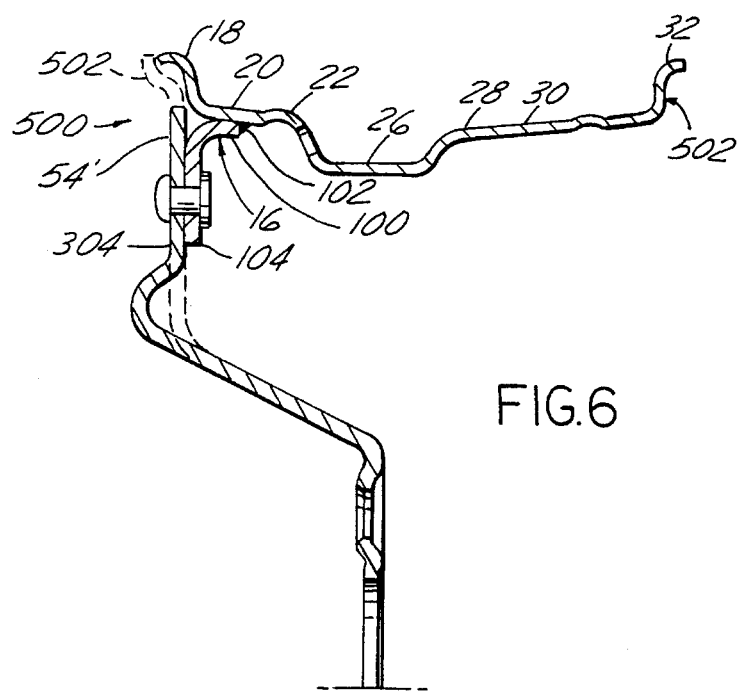
FIG. 6 is a fragmentary radial cross-sectional view of a fourth embodiment of a wheel construction provided in accordance with the present invention.

FIG. 6 illustrates a fourth embodiment wheel 500 also constructed in accordance with the principles of the present invention. Wheel 500 may be termed a "modified full face wheel" in that it employs a conventional rim 502 which may be identical to rim 12 of wheel 10, and hence like reference numerals are applied thereto. Wheel 500 also utilizes the separately formed connector hoop 16 of wheel 10, but the same is modified (enlarged overall diameter) so that flange 100 thereof has a press fit beneath the outboard rim bead seat 20 instead of in the drop center well 26 of the rim. The hoop-to-rim circumferential weld joint 102 is also moved up to the location illustrated beneath bead seat 20. The radially in-turned flange 104 is constructed as described previously in conjunction with hoop 16 and wheel 10.

Likewise wheel 500 may employ the same disc 304 described in conjunction with the wheel 300 but with the outer diameter of the disc enlarged so that the peripheral flange 54' extends further radially outwardly in overlapping relation with flange 104 to thereby overlap the outboard surface of rim flange 18.

The assembly procedure employed to construct wheel 500 is the same as that described previously with respect to wheel 10, with disc 304 being preformed to final dimensions with all of its mounting openings preformed in precise relationship to one another. The final precise relationship of the disc mounting openings relative to the rim bead seats 20 and 30 again as obtained in the assembly and fastening procedures described previously. If desired, a suitable sealant may be applied to the outboard surface of flange 104 at its junction with the rim 502 to prevent corrosion from moisture entrance to the interior surfaces of disc flange 54', hoop 16 and rim 502 where they overlap in assembly. Alternatively, if wheel 500 is designed and constructed for use as a "backbone" in making the aforementioned "POLYCAST" wheels, the urethane outboard molding can also serve this crevice filling and sealing function.

As a further modification of wheel 500, disc 304 may be made with an integral extension of flange 54' shaped complimentarily to the outboard rim flange 18 and overlapping the same, as employed in certain prior commercial modified full face wheels in which a full face disc of this nature is joined by welding to a conventional dual flange drop-center rim. Such a modification is illustrated in phantom in FIG. 6 by the disc extension portion 502 shown in broken lines, where it will be noted that suitable clearance is provided between the "S-bend" portion of extension 502 and the outer curl of rim flange 187 to permit the lateral body shifting of disc 304 during the assembly procedure to provide the precise location of the disc mounting openings relative to the rim bead seats.

Again, with both wheel 400 of FIG. 5 and wheel 500 of FIG. 6, the disc and rim parts may be made by dissimilar processes and from dissimilar materials due to the use of a mechanical versus a welded connection of the disc to the rim. Hence, if desired, the full face disc 404 can be made as a casting or a stamping. Likewise, rim 502 may be made as a casting or forging and modified similar to rim 302, but with the integral mounting flange 306 of rim 302 moved outboard so as to be located at the junction of the rim bead seat 308 and flange 312 and extending radially inwardly of the wheel therefrom for mounting of disc 304 to such a modified rim. A spin formed aluminum rim may also be made with this configuration if desired.

It is also to be understood that the step of permanently interconnecting the disc and rim in the desired precision fixed orientation while holding the parts in their final precision location can be performed in a suitable welding fixture, such as a spot welder, wherein spot welds are substituted for the rivets or threaded fasteners, thereby also eliminating the need for forming the disc and rim assembly holes.

The present invention, therefore, is intended to be limited only by the scope of the appended claims and the applicable prior art.

I claim:

1. A method of constructing a multi-piece, non-take-apart vehicle wheel assembly of the type comprising a single piece drop-center-well rim having an inboard bead seat and an outboard bead seat for mounting of a pneumatic tire thereon, said rim having mounting flange means affixed thereto and extending radially inwardly of the rim, and a wheel mounting disc having a center pilot opening and a circle of wheel mounting bolt holes encircling said center pilot opening for receiving wheel mounting fasteners for fixing said wheel to the wheel mounting structure of a vehicle, said disc having a generally radially extending annular rim mounting portion radially overlapping said rim mounting flange means in assembly therewith, said disc having a first set of mounting holes formed in said disc rim mounting portion, said rim mounting flange means having a second set of mounting holes formed therein, said first and second set of assembly fastener mounting holes having their axis extending axially and parallel to the wheel axis and being disposed in general registry with one another in assembly, the diameter of each hole of one of said sets of assembly holes being preformed to a predetermined dimension slightly larger than the diameter of each of the holes of the other of said sets of assembly holes, and fastener means being constructed and arranged to individually extend through individually registering ones of said first and second sets of assembly holes to permanently interconnect said disc and rim together in assembled relation with said disc and rim, said fastener means each having a shank having a diameter sized to fit tightly in the smaller diameter set of assembly holes and loosely in the larger diameter set of assembly holes to permit misalignment of the axes of the first set of assembly holes with the axes of the second set of assembly holes, the final permanent assembly of said disc and rim providing a final or determined precision permanently fixed orientation of the axis of the center pilot opening of the disc and/or the axis of the circle of bolt holes of the disc relative to the average axis of the bead seats of the rim within the range of possible misalignment of the axes of said first and second set of assembly holes, said method comprising the steps of:

(1) finish forming said rim to final dimensions with one of said first and second set of assembly holes final formed in said mounting flange means thereof, (2) finish forming said disc to final dimensions with said center pilot opening, bolt holes and the other one of said sets of assembly holes finished formed therein, (3) fixturing said rim on an assembly apparatus to orient the average axis of the bead seats of said rim on a predetermined first axis of said apparatus, (4) temporarily assembling said disc and rim by placing said disc loosely on said rim with said disc annular rim mounting portion overlapping radially said rim mounting flange means with said first and second sets of assembly holes in general registry individually with one another to thereby form registered pairs of first and second set holes, (5) precision locating said disc relative to said rim by engaging a locating means of said apparatus in said disc bolt holes and/or center pilot opening to align the axis of the disc bolt holes and/or center pilot opening on a predetermined second axis of the apparatus by lateral bodily shifting of said disc relative to the rim to accomplish said alignment as necessary within the range of possible misalignment of the axes of said first and second sets of assembly holes while maintaining the general individual registry therebetween, (6) assembling fastener means individually in each of the registered pairs of first and second set holes of said first and second sets of assembly holes, and (7) permanently assembling said disc and rim in permanent fixed relationship while located as established in Step (5) by permanently securing said disc and rim together by permanently fixing said fastening means in a non-take-apart mode.

2. The method set forth in claim 1 wherein said rim flange means is formed integrally with the rim.

3. The method set forth in claim 1 wherein said rim flange means is preformed as a separate part in the form of a connector hoop having a peripheral axially extending mounting flange and a radially extending disc connecting flange integral therewith, said connector being press fit into said rim and permanently affixed thereto by welding prior to assembly of the disc to the rim.

4. The method set forth in claim 1, wherein said step of precision locating of said disc after placement on said rim is performed to align one or both of said disc center pilot opening and bolt hole circle axes coincident with the average axis of the bead seats of the rim.

5. The method set forth in claim 1 wherein one or both of said disc center pilot opening and bolt hole circle axes are aligned in said precision locating step so as to be eccentric to the average axis of the rim bead seats by a predetermined amount and in a predetermined direction.

6. The method set forth in claim 5 wherein said predetermined direction of eccentricity is in the direction of a valve hole formed in said rim.

7. The method set forth in claim 1 wherein said step of assembling fastener means further comprises the steps of preassembling a component of said fastener means in said disc assembly holes prior to placing said disc loosely on said rim, and completing assembly of said fastener means from the inboard side of said rim mounting flange means after the step of temporarily assembling said disc on said rim.

8. A method of constructing a multi-piece, non-take-apart vehicle wheel assembly of the type comprising a single piece drop-center-well rim having an inboard bead seat and an outboard bead seat for mounting of a pneumatic tire thereon, said rim having mounting flange means affixed thereto and extending radially inwardly of the rim, and a wheel mounting disc having a center pilot opening and a circle wheel mounting bolt holes encircling said center pilot opening for receiving wheel mounting fasteners for fixing said wheel to the wheel mounting structure of a vehicle, said disc having a generally radially extending annular rim mounting portion radially overlapping said rim mounting flange means in assembly therewith, said method comprising the steps of:

(1) finish forming said rim to final dimensions, (2) finish forming said disc to final dimensions with said center pilot opening and bolt holes finished formed therein, (3) fixturing said rim on an assembly apparatus to orient the average axis of the bead seats of said rim on a predetermined first axis of said apparatus, (4) temporarily assembling said disc and rim by placing said disc loosely on said rim with said disc annular rim mounting portion overlapping radially said rim mounting flange means (5) precision locating said disc relative to said rim by engaging a locating means of said apparatus in said disc bolt holes and/or center pilot opening to align the axis of the disc bolt holes and/or center pilot opening on a predetermined second axis of the apparatus by lateral bodily shifting of said disc relative to the rim to accomplish said alignment as necessary, (6) and permanently assembling said disc and rim in permanent fixed relationship while located as established in Step (5) by permanently securing said disc and rim together in a non-take-apart mode whereby final permanent assembly of said disc and rim provides a final predetermined precision permanently fixed orientation of the axis of the center pilot opening of the disc and/or the axis of the circle of bolt holes of the disc relative to the average axis of the bead seats of the rim.

9. The method set forth in claim 8 wherein said rim flange means is formed integrally with the rim.

10. The method set forth in claim 8 wherein said rim flange means is preformed as a separate part in the form of a connector hoop having a peripheral axially extending mounting flange and a radially extending disc connecting flange integral therewith, said connector being press fit into said rim and permanently affixed thereto by welding prior to assembly of the disc to the rim.

11. The method set forth in claim 8 wherein said step of precision locating of said disc after placement on said rim is performed to align one or both of said disc center pilot opening and bolt hole circle axes coincident with the average axis of the bead seats of the rim.

12. The method set forth in claim 8 wherein one or both of said disc center pilot opening and bolt circle axes are aligned in said precision locating step so as to be eccentric to the average axis of the rim bead seats by a predetermined amount and in a predetermined direction.

13. The method set forth in claim 12 wherein said predetermined direction of eccentricity is in the direction of a valve hole formed in said rim.

* * * * *